United States Patent [19]

Rietzler

[11] Patent Number: 5,029,925
[45] Date of Patent: Jul. 9, 1991

[54] PICKUP DEVICE FOR BOTTLES

[75] Inventor: Erich Rietzler, Hüttlingen, Fed. Rep. of Germany

[73] Assignee: Rico-Maschinenbau Max Appel KG, Aalen/Wurtt, Fed. Rep. of Germany

[21] Appl. No.: 363,267

[22] Filed: Jun. 8, 1989

[30] Foreign Application Priority Data

Jun. 9, 1988 [DE] Fed. Rep. of Germany ....... 3819598

[51] Int. Cl.$^5$ .............................................. B66C 1/48
[52] U.S. Cl. ...................................... 294/100; 294/88
[58] Field of Search .................... 294/100, 119.3, 99.1, 294/90, 98.1, 93, 88

[56] References Cited

U.S. PATENT DOCUMENTS

| 2,873,996 | 2/1959 | McHugh, Jr. | 294/90 |
| 2,899,232 | 8/1959 | Walter, Jr. | 294/100 X |
| 3,086,805 | 4/1963 | Dardaine et al. | 294/100 X |
| 3,178,217 | 4/1965 | Bargel | 294/119.3 |
| 3,554,594 | 1/1971 | Thoma | 294/100 X |
| 4,168,073 | 9/1979 | La Rue | 294/93 X |

FOREIGN PATENT DOCUMENTS

| 2816458 | 10/1979 | Fed. Rep. of Germany ... 294/119.3 |
| 1044075 | 11/1953 | France .............................. 294/119.3 |
| 1001327 | 8/1965 | United Kingdom ............. 294/119.3 |

Primary Examiner—Margaret A. Focarino
Assistant Examiner—Dean J. Kramer
Attorney, Agent, or Firm—Herbert Dubno; Andrew Wilford; Ronald Lianides

[57] ABSTRACT

A grab for picking up a bottle by its neck has a hollow housing sleeve having a mouth engageable down over the neck of the bottle, an upwardly directed annular abutment in the sleeve adjacent the mouth thereof, and an elastically deformable cuff in the sleeve having a lower end resting on the abutment and an upper end. A piston vertically displaceable in the sleeve has a lower face bearing on the upper end of the cuff and an upper face defining with the sleeve a pressurizable compartment. This compartment can be pressurized to vertically compress the cuff and deflect same inward between its ends against the neck of a bottle engaged in the housing within the cuff.

7 Claims, 3 Drawing Sheets

PICKUP DEVICE FOR BOTTLES

FIELD OF THE INVENTION

The present invention relates to a grab or device used to pick up a bottle or the like. More particularly this invention concerns such a device used in a bottling plant to lift a filled and capped bottle.

BACKGROUND OF THE INVENTION

It is standard for a bottle (the term here intended to cover any vessel having an upwardly open normally capped neck) to be picked up off a conveyor after it has been filled and capped or to be picked from a case or carton and deposited on such a conveyor by a piece of automatic equipment having a pickup device. Such a device normally engages down over the capped neck of the bottle and then into engagement with the sides of the neck with sufficient force that, once the device is lifted, the bottle comes with it.

In the normal embodiment of such a device a relatively thin elastic cuff is provided inside the grab and is connected to a source of fluid, normally air, under pressure. The cuff is inflated so that its inner periphery bears on the bottle's neck. Such an arrangement can readily accommodate minor variations in neck size and bottle position, and can even lift a bottle that has no cap.

The main disadvantage of such an arrangement is that the cuff can be damaged fairly easily. A standard crown top has sufficient sharp edges to rapidly wear out the cuff, and a tamperproof screw cap also is irregular enough to present a danger to the cuff. If the cap is missing and the bottle neck is broken, which is a not uncommon occurrence, puncturing of the cuff is highly likely.

Making the cuff fairly thick and durable does lessen the likelihood of it being punctured, but means that the device must be operated at substantially higher pressure in order to provide the necessary holding force. Even with such a thicker cuff, the slightest puncture renders the device useless, and replacing the cuff is a fairly complex operation entailing substantial disassembly of the equipment.

OBJECTS OF THE INVENTION

It is therefore an object of the present invention to provide an improved pickup device for a bottle which overcomes the above-mentioned disadvantages.

Another object is the provision of such an improved pickup device for a bottle which overcomes the above-given disadvantages, that is which is durable enough that it is very difficult to puncture, and that nonetheless grabs the bottle with sufficient force.

SUMMARY OF THE INVENTION

A grab for picking up a bottle by its neck has according to the invention a hollow housing sleeve having a mouth engageable down over the neck of the bottle, an upwardly directed annular abutment in the sleeve adjacent the mouth thereof, and an elastically deformable cuff in the sleeve having a lower end resting on the abutment and an upper end. A piston vertically displaceable in the sleeve has a lower face bearing on the upper end of the cuff and an upper face defining with the sleeve a pressurizable compartment. This compartment can be pressurized to vertically compress the cuff and deflect the same inward between its ends against the neck of a bottle engaged in the housing within the cuff.

Thus, with this arrangement, the cuff itself can be perforated or cut without its function being substantially impaired. In fact it can be made of a fairly thick and durable, but soft elastomer so that even if cut completely through it will continue to hold well on a bottle neck.

According to a feature of this invention the cuff is tubular, generally centered on an axis, and formed between its ends with a plurality of radially throughgoing holes constituted either as axial slots or circles. This cuff is waisted, having a central region of smaller diameter than both of its ends and the holes are formed at the waist. In other words the cuff has a generally frustoconical and downwardly tapering upper portion and a generally frustoconical and upwardly tapering lower portion joined at a waist to the upper portion. This waist constitutes the region where the cuff will naturally bend inward. The upper portion is according to this invention substantially longer than the lower portion so that a very good hold on the bottle's neck is achieved, in particular on a crown- or screw-cap bottle.

According to another feature of this invention there are a predetermined number of such holes in the cuff that are each generally circular with a diameter equal to the circumference of the cuff at the waist divided by twice the predetermined number. When there are three such holes each hole extends over one-sixth of the circumference. These holes make the cuff highly flexible at its central gripping region and augment the holding effect. Thus the bottle does not swing as it is being lifted and carried, and any coating on the bottle is not damaged.

It is also possible according to this invention for the sleeve to be centered on an axis and for the cuff to have a plurality of axially extending part-cylindrical webs generally angularly equispaced about the axis. Each of the webs is generally a third of a cylindrical tube and is radially inwardly concave.

The piston according to this invention is provided with a peripheral downwardly projecting skirt within which the upper end of the cuff sits so that this cuff is protected from wear against the sleeve at its upper end. The sleeve is provided at a predetermined spacing below the piston in an unpressurized condition of the compartment with an inwardly projecting stop. Thus if no bottle is picked up the stroke of the piston is limited by the stop and the cuff is not excessively compressed. The sleeve has an upper end provided with a sealed plug forming the compartment with the sleeve and the piston.

DESCRIPTION OF THE DRAWING

The above and other objects, features, and advantages will become more readily apparent from the following, reference being made to the accompanying drawing in which.

SPECIFIC DESCRIPTION

Figure 1:
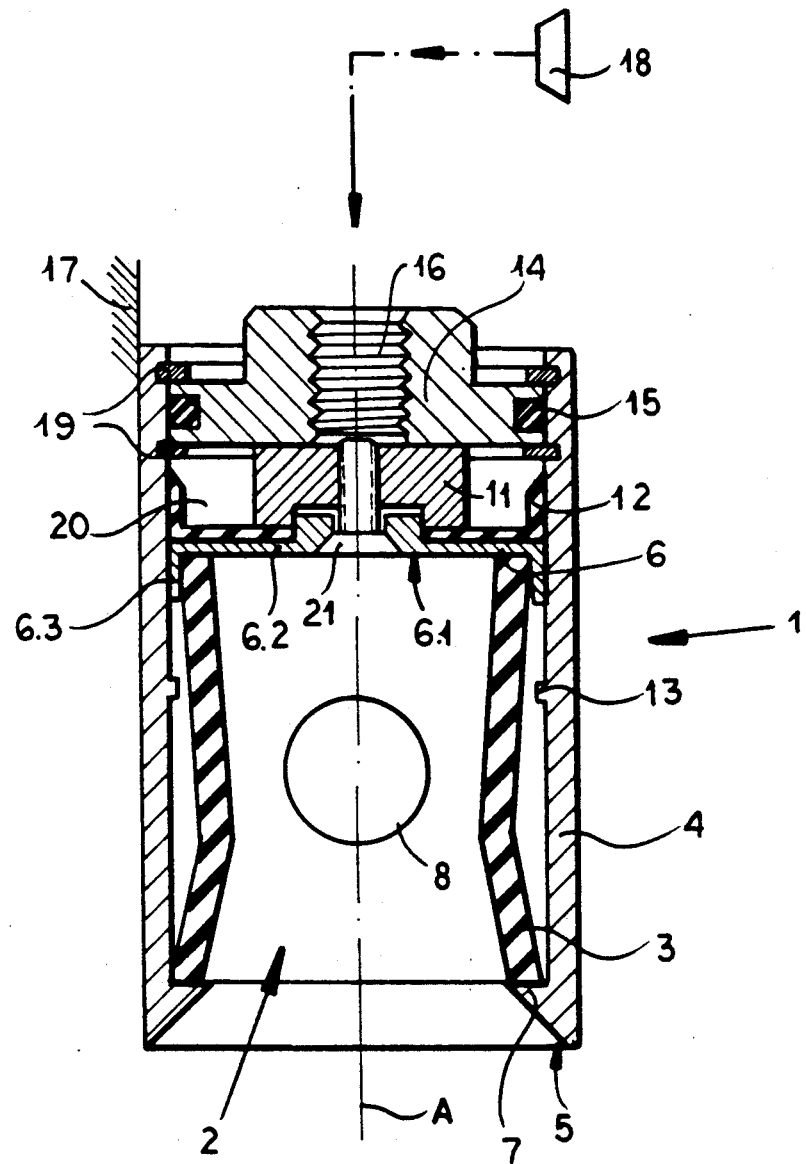
FIG. 1 is a partly diagrammatic axial section through a bottle pickup device according to this invention.

As seen in FIG. 1 a grab or pickup device 1 according to this invention is used for lifting a bottle B (FIGS. 5A and 5B only) having a cap C from a box or conveyor belt to place it on a conveyor belt, box, or the like. The grab 1 is carried on a support indicated schematically at 17 that can move vertically and horizontally and is connected to a source 18 of air under pressure.

The grab 1 has a cylindrical housing sleeve 4 with a hollow interior 2, centered on a normally vertical axis A, and having a lower end 5 formed with a frustoconical inner edge or mouth adapted to fit over the top of the bottle B. Inside this sleeve 4 is an elastomeric cuff 3 of hyperboloidal shape and having a lower end sitting on a shoulder 7 formed internally in the sleeve 4 at the mouth thereof and an upper end bearing axially oppositely on a piston 6 that itself is axially reciprocal in the sleeve 4.

The upper end of the sleeve 4 is closed by a plug 14 sealed peripherally by an O-ring 15 and held axially in place between snap rings 19. This plug 14 has at the axis A a through going port 16 connected by unillustrated hose to the fluid source 18.

The piston 6 is formed by a rigid metallic front plate 6.1 having a disk 6.2 extending perpendicular to the axis A and formed with a downwardly projecting rim or skirt 6.3 within which fits the upper end of the cuff 3. This plate 6.1 is secured by a screw 21 to a spacer block 11 that maintains the piston 6 a predetermined distance below the plug 14, and an upwardly cupped gland 12 has an inner periphery clamped between the plate 6.1 and the spacer 11 and an upwardly projecting rim or skirt riding on the cylindrical inner wall of the sleeve 4. The plug 14, sleeve 4, and piston 6 therefore define a pressurizable compartment 20. A radially inwardly projecting ridge 13 formed inside the sleeve at some spacing below the normal position of the piston 6 when the compartment 20 is not pressurized acts as a limit or stop for the piston 6.

Figure 2:
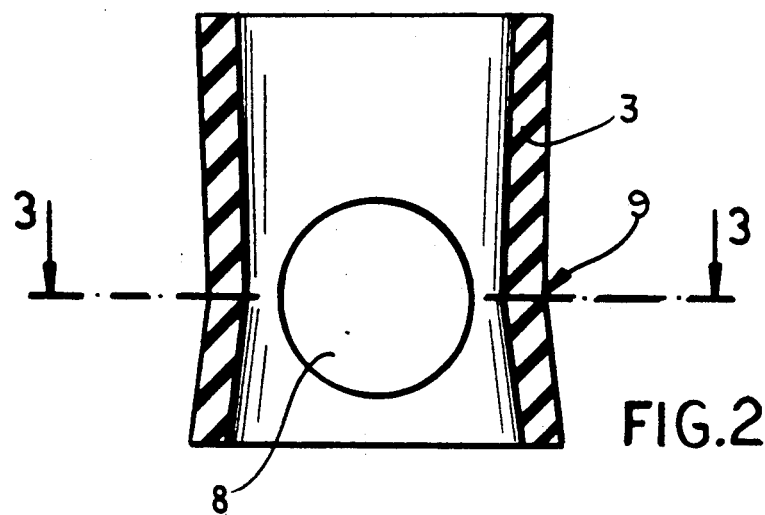
FIG. 2 is an axial section through the pickup cuff of the device of the invention.
Figure 3:
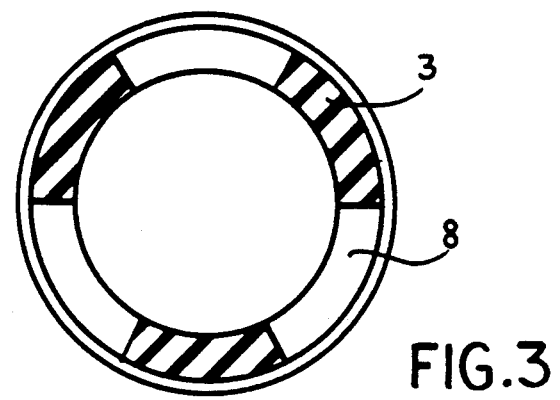
FIG. 3 is a section taken along line 3—3 of FIG. 2.

As best shown in FIGS. 2 and 3 the cuff 3 is waisted, that is it is of smaller diameter between its ends than at its ends which are of substantially the same diameter, having a waist 9 that is here located about two-thirds of the way from the top of the cuff 3. In addition this cuff 3 is formed with three angularly equispaced circular and radially throughgoing holes 8 centered on a plane at the waist 9 and each of a diameter equal to about one-sixth of the circumference of the cuff 3 at the waist 9.

Figure 4:
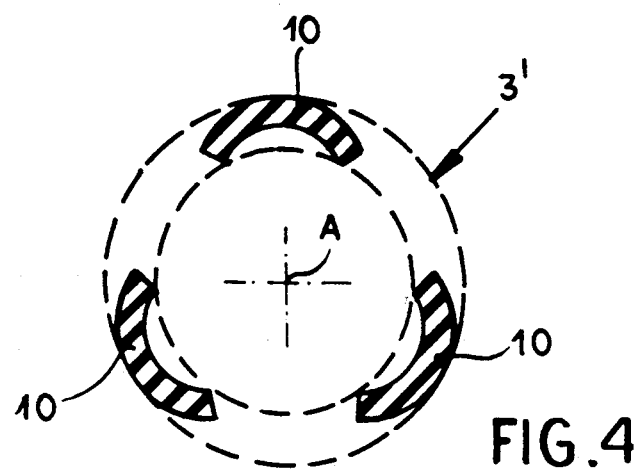
FIG. 4 is a section like FIG. 3 but of another cuff according to the invention.

FIG. 4 shows an alternate arrangement where the cuff 3' has or is formed with three part-cylindrical webs 10 that are concave radially inward and angularly equispaced about the axis A. Each of these webs 10 is centered on an axis parallel to the axis A and extends over about 120° relative to the respective generatrix.

Figures 5A, 5B:
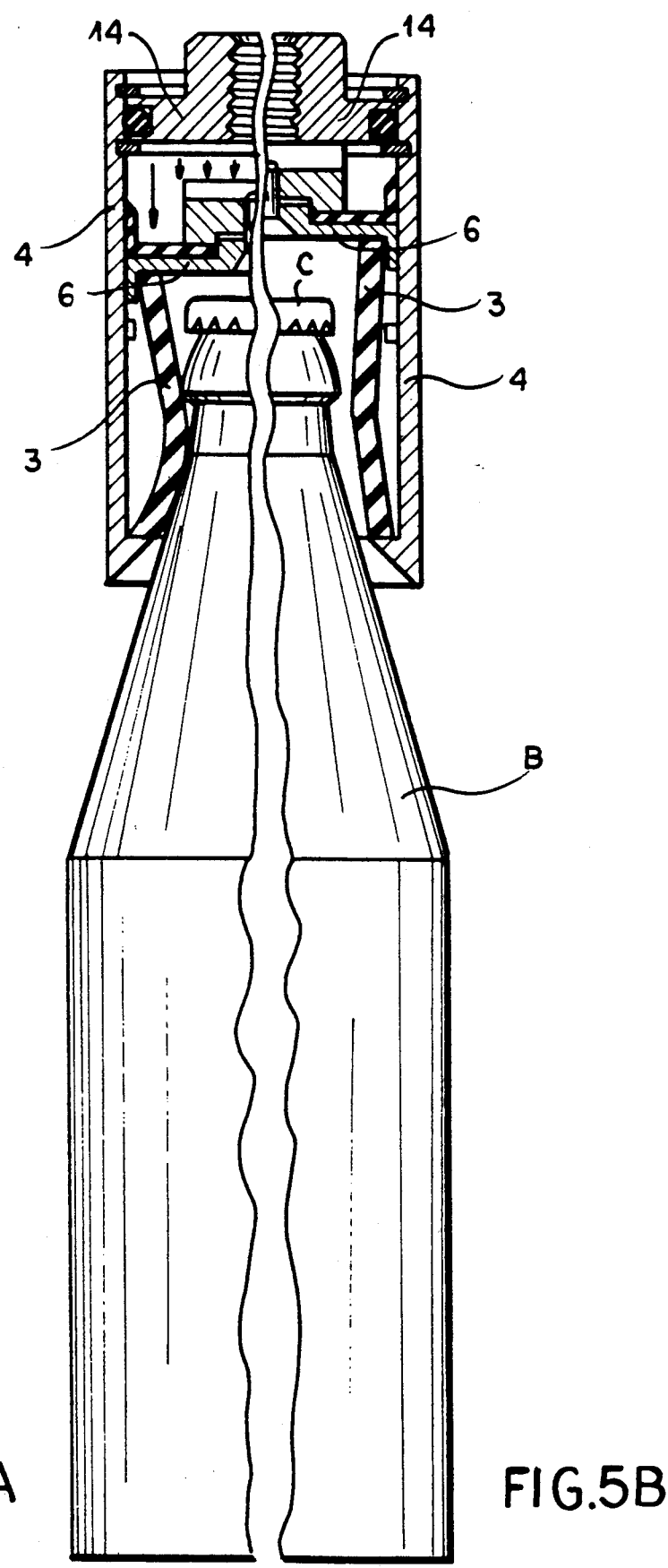
FIGS. 5A and 5B are axial sections through the pickup device of this invention as seen in FIG. 1 in the holding and releasing positions, respectively.

As best seen in FIG. 5B when the grab 1 is set over a bottle according to this invention with its compartment 20 unpressurized, the bottle neck and cap C can easily fit up within the cavity 2 within the cuff 3. Then as seen in FIG. 5A the compartment 20 is pressurized to axially compress the cuff 3 and bow it inward at its waist 9, thereby bringing it into good contact with the bottle B below its cap C. The provision of the holes 8 makes the cuff 3 relatively easy to deform while in no significant manner lessening the grip it will get on the bottle B.

The cuff 3 can be of a fairly thick and durable but soft elastomer so that it can readily be deformed and will gain a good hold on the bottle B. At the same time if it is cut or punctured it will continue to function perfectly. In fact the cuff can be virtually cut in half and continue to work well so that it will have a very long service life. Replacing it is also a fairly simple task since it does not have to be painstakingly coupled up or sealed in place; instead the damaged cuff 3 is simply pried out of the mouth 5 and a new one is pushed into place, without any disassembly of the grab 1.

I claim:

1. A grab for picking up a bottle by a neck thereof, the grab comprising:
   a hollow housing sleeve centered on an upright axis and having
      a downwardly open mouth engageable down over the neck of the bottle and formed internally with a radially inwardly projecting abutment, and
      an upper end provided with a sealed plug;
   an elastically deformable waisted cuff in the sleeve centered on the axis and having
      a generally frustoconical and downwardly tapering upper portion forming a lower end resting on the abutment,
      a generally frustoconical and upwardly tapering lower portion joined at a waist to the upper portion and forming an upper end, the upper portion being substantially longer than the lower portion, and
      a middle region of smaller diameter than the upper and lower ends, the cuff being formed at the middle region with a predetermined number of radially throughgoing generally circular holes each of a diameter generally equal to the circumference of the cuff at the middle region divided by twice the predetermined number;
   a piston vertically displaceable int eh sleeve and having a lower face bearing on the upper end of the cuff and an upper face defining with the sleeve and with the plug a pressurizable compartment, the sleeve being provided at a predetermined spacing below the piston in an unpressurized condition of the compartment with an inwardly projecting stop, whereby the stroke of the piston is limited by the stop; and
   means for pressurizing the compartment and thereby vertically compressing the cuff and deflecting the middle region radially inward against the neck of a bottle engaged in the housing within the cuff.

2. The grab defined in claim 1 wherein the sleeve is centered on an axis and the cuff has a plurality of axially extending part-cylindrical webs generally angularly equispaced about the axis and defining the middle region.

3. The grab defined in claim 1 wherein the piston is provided with a peripheral downwardly projecting skirt within which the upper end of the cuff sits.

4. A grab for picking up a bottle by a neck thereof, the grab comprising:
   a hollow housing sleeve centered on an upright axis and having
      a downwardly open mouth engageable down over the neck of the bottle and formed internally with a radially inwardly projecting abutment, and
      an upper end provided with a sealed plug;
   an elastically deformable waisted cuff in the sleeve centered on the axis and having a lower end resting on the abutment, an upper end, and a middle region of smaller diameter than the upper and lower ends, the cuff being formed between its ends with a plurality of axially extending part-cylindrical webs generally angularly equispaced about the axis constituting the middle region and defining a plurality of radially throughgoing holes, each of the webs being generally a third of a cylinder and radially inwardly concave;

a piston vertically displaceable in the sleeve and having a lower face bearing on the upper end of the cuff and an upper face defining with the sleeve and with the plug a pressurizable compartment, the sleeve being provided at a predetermined spacing below the piston in an unpressurized condition of the compartment with an inwardly projecting stop, whereby the stroke of the piston is limited by the stop; and means for pressurizing the compartment and thereby vertically compressing the cuff and deflecting the middle region radially inward against the neck of a bottle engaged in the housing within the cuff.

5. The grab defined in claim 4 wherein the cuff has a generally frustoconical and downwardly tapering upper portion and a generally frustoconical and upwardly tapering lower portion joined at a waist to the upper portion, the upper portion being substantially longer than the lower portion.

6. The grab defined in claim 5 wherein the cuff is formed at the middle region with a plurality of radially throughgoing holes.

7. The grab defined in claim 6 wherein there are a predetermined number of such holes and each of the holes is generally circular and has a diameter equal to the circumference of the cuff at the middle region divided by twice the predetermined number.

* * * * *